(12) United States Patent
McSherdon

(10) Patent No.: US 6,220,525 B1
(45) Date of Patent: Apr. 24, 2001

(54) FIRE ANT ERADICATION APPARATUS

(76) Inventor: Joe A. McSherdon, 2065 Chula Vista Mountain Rd., Pell City, AL (US) 35125-4407

( * ) Notice: Subject to any disclaimer, the term of this patent is extended or adjusted under 35 U.S.C. 154(b) by 0 days.

(21) Appl. No.: 09/442,216

(22) Filed: Nov. 17, 1999

(51) Int. Cl.⁷ .................................. A62C 1/00; B05B 1/26
(52) U.S. Cl. ....................... 239/271; 239/288.5; 239/310; 239/544; 239/567; 43/124; 43/130; 43/132.1; 47/48.5; 111/7.1; 111/7.2
(58) Field of Search ..................................... 239/271, 276, 239/288, 288.3, 288.5, 302, 310, 315, 316, 318, 548, 544, 543, 567; 43/124, 130, 132.1; 47/48.5; 111/7.1, 7.2, 7.3, 7.4

(56) References Cited

U.S. PATENT DOCUMENTS

| | | | |
|---|---|---|---|
| 1,937,171 | * 11/1933 | Starner et al. | 111/7.1 |
| 2,333,727 | * 11/1943 | Lucas | 239/271 X |
| 2,713,834 | * 7/1955 | Shirley | 239/271 X |
| 3,026,827 | * 3/1962 | Cunningham | 111/7.1 |
| 3,405,669 | * 10/1968 | Nimrick | 239/310 X |
| 4,160,336 | 7/1979 | Query et al. . | |
| 4,637,161 | 1/1987 | Turner . | |
| 4,705,218 | 11/1987 | Daniels . | |
| 4,756,118 | 7/1988 | Evans, II . | |
| 4,815,234 | 3/1989 | Connolly . | |
| 4,865,257 | * 9/1989 | Bailey | 239/288.5 |
| 4,872,411 | * 10/1989 | Nagy | 111/7.1 |
| 5,050,340 | 9/1991 | Seifert . | |
| 5,054,231 | 10/1991 | Witherspoon . | |
| 5,253,716 | * 10/1993 | Mitchell | 239/544 X |
| 5,325,626 | 7/1994 | Jackson . | |
| 5,558,030 | 9/1996 | Ward . | |
| 5,870,852 | 2/1999 | Stanley . | |

* cited by examiner

Primary Examiner—David A. Scherbel
Assistant Examiner—Steven J. Ganey
(74) Attorney, Agent, or Firm—Dale J. Ream

(57) ABSTRACT

A fire ant eradication apparatus comprises a tubular handle having a first end adapted for attachment to a pressurized water source and a second end. The apparatus further includes a conduit having proximal and distal ends relative to a user with the proximal end coupled to the second end of the handle for fluid transmission therebetween. A dispensing assembly is attached to the handle with the conduit extending therethrough. Insecticide is aspirated from the dispensing assembly into the conduit as water flows through the conduit. The conduit includes a plurality of longitudinally spaced apart nozzle assemblies for dispersing the insecticide from the conduit. The distal end of the conduit includes a point assembly having a cone section and a tip. The upper end of the cone section has a diameter greater than the diameter of the conduit such that the nozzle assemblies will not become clogged with soil as the apparatus is inserted into the ground.

13 Claims, 5 Drawing Sheets

FIRE ANT ERADICATION APPARATUS

BACKGROUND OF THE INVENTION

This invention relates to an apparatus for insect eradication and, more particularly, to an apparatus for the eradication of South American fire ants.

The imported South American fire ant is one of the most harmful and destructive pests in the United States. Many areas of the United States are already infested with the fire ant and the fire ant will, in time, likely inhabit most of the country. These destructive pests form large mound communities which disrupt mechanized farming, damage crops, and may injure or kill livestock. Fire ant mounds are typically two to four feet deep although some fire ant colonies extend twenty feet into the ground with wide spread lateral tunnels. Fire ants are extremely defensive creatures that will attack any attempt to eradicate them. Fire ant bites can be painful and leave small welts on a person's skin. Thus, eradication must be swift and thorough.

Several devices have been proposed for eradicating fire ants, such as those disclosed in U.S. Pat. Nos. 5,054,231 and 5,870,852. The outlet ports of these devices, however, may become clogged as the apparatus penetrates the soil which hinders the fast and thorough eradication of a fire ant colony. It is also difficult to quickly penetrate hardened, dry soil using the previously patented devices.

Therefore, it is desirable to have a fire ant eradication device which forms a bore in the ground having a diameter greater than the diameter of the conduit such that outlet ports through the conduit will not become clogged upon insertion into the ground. It is further desirable to have an apparatus which can be driven into hardened ground with a hammer, if necessary, for fast positioning thereof.

SUMMARY OF THE INVENTION

The fire ant eradication apparatus according to the present invention includes a tubular handle coupled to an elongated tubular conduit. The handle includes a first portion having a first end that may be coupled to a pressurized water source and a second end coupled to a proximal end of the conduit relative to a user for transmission of water therebetween. The conduit extends through an insecticide dispenser assembly that is attached to the handle. The dispenser assembly includes a tube through which insecticide is aspirated from a dispenser housing into the conduit as water flows through the conduit. The dispenser includes a rigid top plate that may be struck by a blunt object such as hammer when inserting the apparatus into hardened soil.

The conduit includes a plurality of spaced apart outlet ports through which the insecticide is expelled. Each outlet port extends through an angularly tapered face that is configured to preclude mud or dirt from clogging the ports when the apparatus penetrates the ground. The distal end of the conduit includes a cone section and a tip. The tip enables the conduit to penetrate a ground surface. The cone section has a diameter that is greater than the diameter of the conduit. Thus, the cone section forms a bore in the ground surface such that outlet ports thereon are not clogged with soil during penetration.

The apparatus further includes a shroud having a radially extending surface that is longitudinally slidable to a desired position along the elongated conduit. For example, the shroud may be positioned adjacent the ground surface following full penetration of the apparatus so as to inhibit the escape of any fire ants from the mound. Alternatively, the shroud may be positioned a distance above the ground to allow the insecticide to be evenly distributed over a wider area in an umbrella-like manner.

Therefore, a general object of the invention is to provide an apparatus for eradicating fire ants.

Another object of this invention is to provide an apparatus, as aforesaid, which can dispense insecticide at predetermined intervals along the conduit.

Still another object of this invention is to provide an apparatus, as aforesaid, which can withstand impact forces while being driven into hardened soil with a blunt object such a hammer.

Yet another object of this invention is to provide an apparatus, as aforesaid, which can form a bore during ground penetration that is large enough to preclude the outlet ports from becoming clogged with soil.

A further object of this invention is to provide an apparatus, as aforesaid, which includes outlet port assemblies having angularly tapered faces for improving distribution of insecticide dispersion.

A still further object of this invention is to provide an apparatus, as aforesaid, having a refillable insecticide container.

A particular object of this invention is to provide an apparatus, as aforesaid, having a shroud which can distribute insecticide over a selected area of the ground surface.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 5:
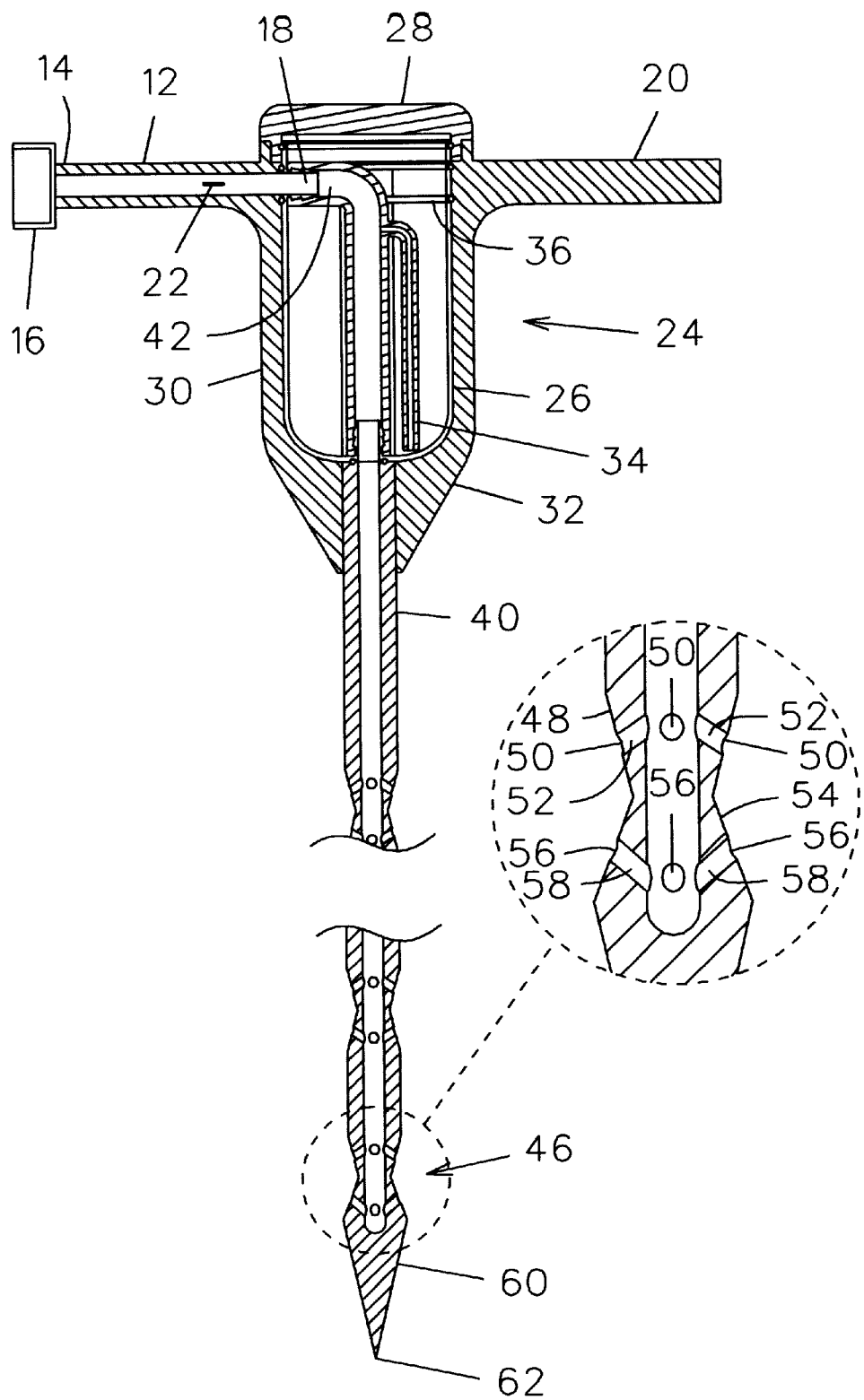
FIG. 5 is a sectional view taken along line 5—5 of FIG. 2.

Turning to the drawings, FIGS. 1 through 5 show a fire ant eradicating apparatus 10 constructed in accordance with a preferred embodiment of the present invention. The apparatus 10 comprises first 12 and second 20 handles, an insecticide dispensing assembly 24, and an elongated tubular conduit 40. The first handle 12 is tubular while the second handle 20 has a solid construction (FIG. 5). A first free end 14 of the first handle 12 includes a threaded coupling 16 which may be attached to a pressurized water source, such as a garden hose. The conduit 40 includes proximal 42 and distal 44 ends relative to a user. An opposed end 18 of the first handle 12 is coupled to the proximal end 42 of the conduit 40 for fluid transmission between the first handle 12 and the conduit 40. The first handle 12 further includes a shutoff valve 22 for regulating the flow of water therethrough.

The dispensing assembly 24 generally comprises a transparent cylindrical housing 26 having a top plate 28 and supported by side walls 30 and a downwardly tapered lower section 32. The side walls 30 include elongate apertures to enable viewing the contents in the housing 26. The top plate 28 is threadably detachable from the housing 26 for filling the housing 26 with a concentrated formula fluid, such as an insecticide or other liquid to be dispensed. The top plate 28 is constructed of a rigid material such as iron, steel, or the like that can withstand repeated impact forces, such as the pounding of a hammer. The first 12 and second 20 handles are fixedly attached to and extend from the housing 26 in opposed directions normal to the walls 30 such that a user can accurately guide and exert pressure upon the apparatus 10 for ground penetration. The junction between the first handle 12 and the proximal end 42 of the conduit 40 are positioned within the housing 26 and sandwiched between O-ring seals 36. An upper portion of the conduit 40 extends longitudinally through the housing 26 and through an opening in the lower section 32 thereof. A tube 34 is connected to the conduit 40 within the housing 26 and extends into the housing 26 (FIG. 5). As water flows through the conduit, insecticide is aspirated from the housing 26 into the conduit 40 according to Bernoulli's principle of fluid dynamics.

The conduit 40 includes a plurality of nozzle assemblies 46 longitudinally spaced apart between the dispensing assembly 24 and the distal end 44 of the conduit 40. Each nozzle assembly 46 includes an upstream portion 48 and a downstream 54. Each upstream portion 48 presents a downwardly tapered face having a plurality of apertures 50 radially spaced thereabout and extending therethrough. Each aperture 50 communicates with the tubular interior of the conduit 40 through a channel 52 extending therebetween. Each nozzle assembly 46 further includes a downstream 54 that presents an upwardly tapered face having a plurality of apertures 56 radially spaced thereabout and extending therethrough. Each aperture 56 communicates with the interior of said conduit through a channel 58 extending therebetween. This tapered configuration allows each pair of apertures 50, 56 to disperse insecticide toward a common focal point to more effectively dislodge any obstructions, such as soil that may have adhered to the conduit during ground penetration.

Figure 1:
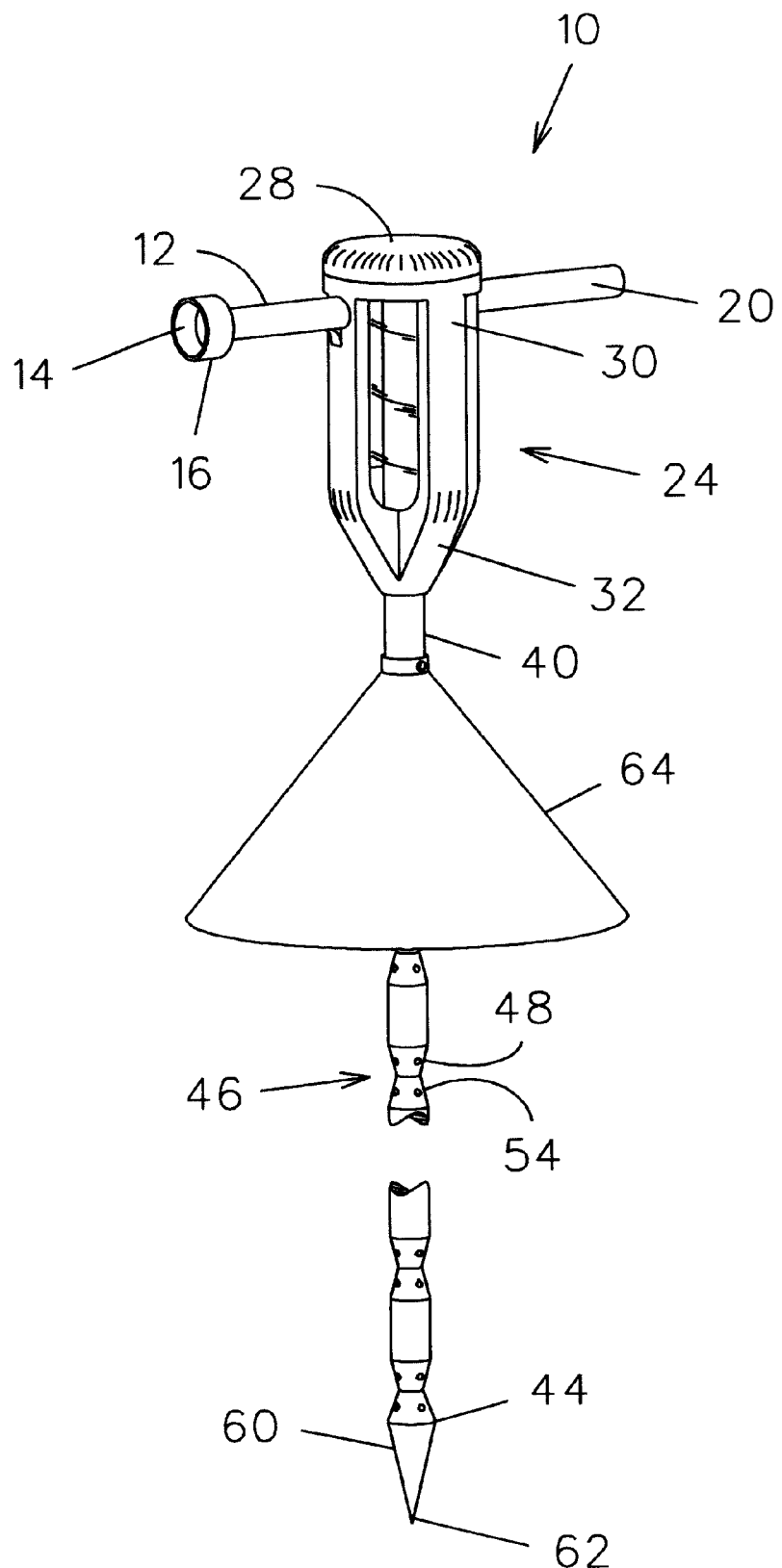
FIG. 1 is a perspective view of the apparatus according to the present invention.
Figure 2:
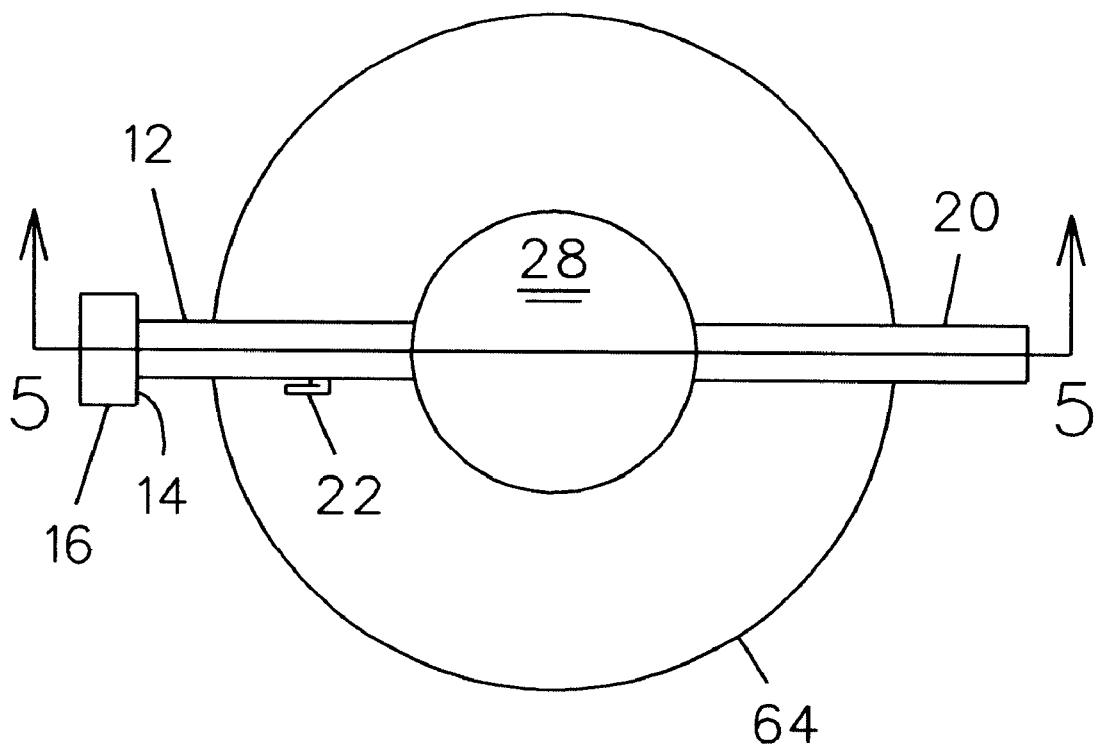
FIG. 2 is a top view of the apparatus as in FIG. 1.
Figure 3:
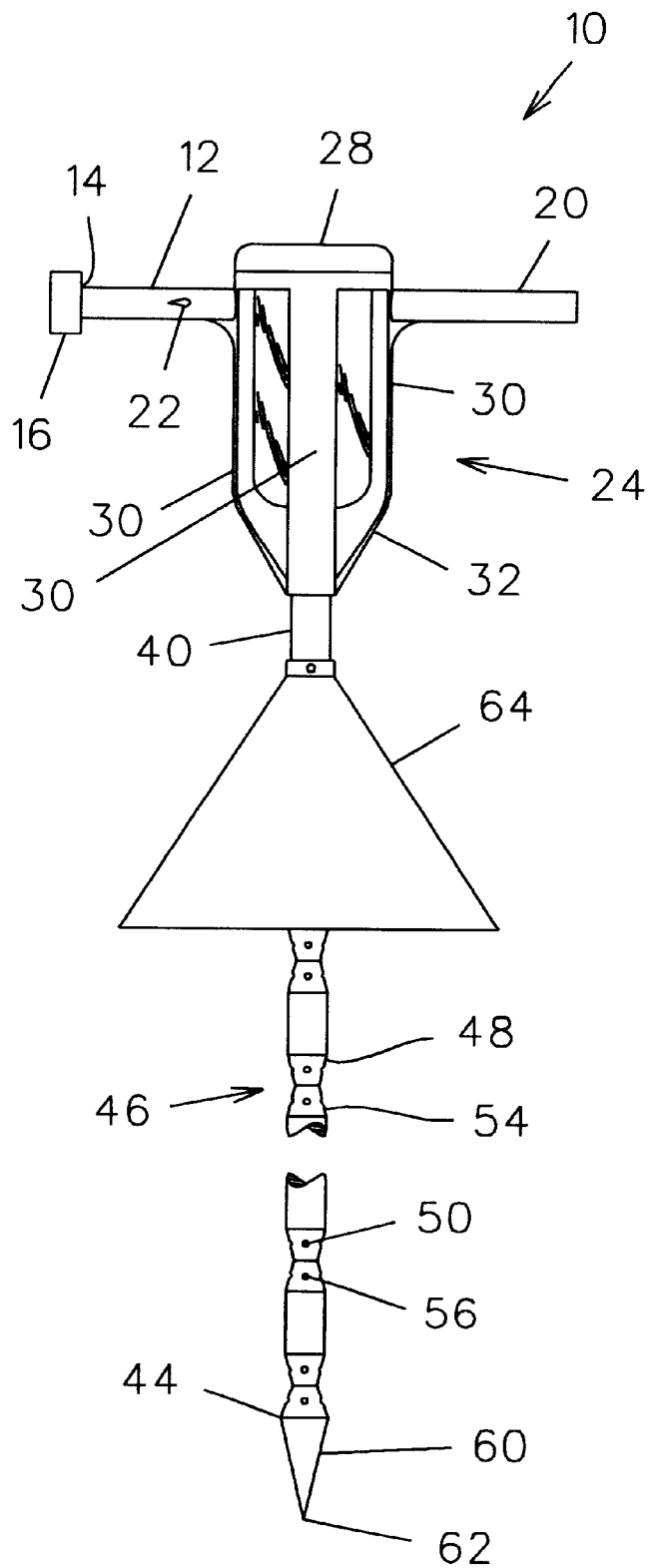
FIG. 3 is a front view of the apparatus as in FIG. 1.
Figure 4:
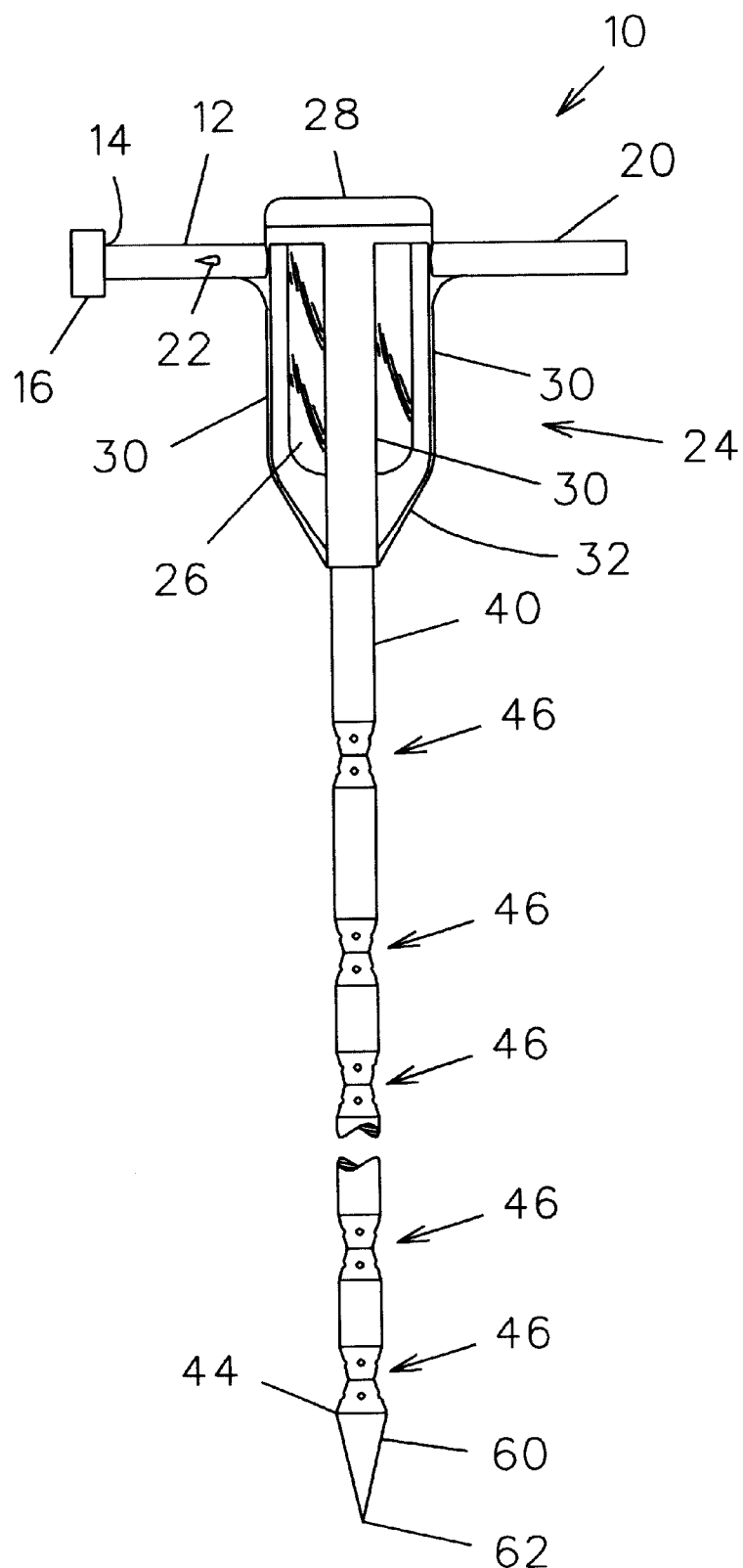
FIG. 4 is a front view of the apparatus as in FIG. 3 with the shroud removed.

The distal end 44 of the conduit 40 includes a point assembly comprising a cone section 60 which terminates at a tip 62. The upper edge of the cone section 60 is integrally connected to the lower edge of an upwardly adjacent downstream portion 54 of a nozzle assembly 46 (FIG. 3). This juncture presents a diameter that is greater than the diameter of the conduit 40. Thus, upon ground penetration, the cone section 60 forms a bore in the soil having a diameter greater than the diameter of the conduit such that the apertures 50, 56 of the nozzle assemblies 46 do not become clogged with soil.

The apparatus further includes a shroud 64 having a radially extending surface that is longitudinally slidable to a desired position along the elongated conduit. For example, the shroud 64 may be positioned adjacent the ground surface following full penetration of the apparatus so as to inhibit the escape of any fire ants from the mound. Alternatively, the shroud 64 may be positioned a distance above the ground to allow the insecticide to be evenly distributed over a wider area in an umbrella-like manner.

In operation as a fire ant eradicator, the top plate 28 of the housing 26 is threadably removed and the housing is filled with fire ant insecticide. The first handle 12 is coupled to the water source. The valve 22 remains in a closed or "off" position until the user is ready to insert the apparatus 10 into a fire ant mound. If the ground surface is soft enough, the tip 62 of the apparatus 10 may be placed on the desired ground location and the apparatus 10 may be inserted therein by a user exerting pressure upon the handles. By turning the valve to an "on" position just prior to insertion, a defensive attack by escaping fire ants may be prevented. If the ground is too hard, the apparatus 10 may be driven therein by striking the top plate 28 with a hammer. Insecticide is mixed with water as the water flows through the conduit. The insecticide flows freely from the nozzle assemblies due to the enlarged bore created by the point assembly configuration.

Alternatively, the apparatus 10 may be used effectively as a plant and root fertilizer by placing a desired fertilizer liquid in the dispensing assembly rather than insecticide.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is described as follows:

1. An apparatus for mixing a concentrated formula fluid with water and dispensing the mixture, the apparatus comprising:

an elongated conduit having first and second ends and an axial bore extending substantially between said first and second ends, said conduit having a nozzle assembly intermediate said first and second ends comprising:
an upstream portion having a downwardly tapered face defining an aperture in fluid registration with said bore;
a downstream portion having an upwardly tapered face defining an aperture in fluid registration with said bore;

a first tubular handle attached to said container and normal to said conduit, said first handle having a free end adapted for connection with a pressurized water source and an opposed end coupled to said first end of said conduit; and a second handle attached to said container and extending opposite said first handle, whereby said second end of said conduit penetrates a ground surface when force is exerted on said first and second handles by a user and said second end of said conduit is in contact with the ground surface;

a container for holding a concentrated formula fluid coupled to said conduit, said conduit extending through said container; and means for mixing the formula fluid with the water flowing through said conduit, said mixing means including a tube connected to said conduit within said container at one end and extending into said container, whereby the flow of pressurized water through said conduit aspirates the formula fluid from said container into said conduit.

2. An apparatus as in claim 1 further including a valve for regulating the flow of water through the conduit.

3. An apparatus as in claim 1 further including a shroud having a radially extending surface and longitudinally slidable along said conduit for movement between a first position adjacent said nozzle assembly and a second position displaced from said nozzle assembly.

4. An apparatus as in claim 1 wherein said conduit includes a plurality of spaced apart nozzle assemblies, each nozzle assembly comprising:

an upstream portion having a downwardly tapered face defining at least one aperture through said conduit, said aperture being recessed from a longitudinal plane defined by said conduit; and a downstream portion having an upwardly tapered face defining at least one aperture through said conduit, said aperture being recessed from said longitudinal plane of said conduit, said face of said downstream portion in abutting engagement with said face of said upstream portion.

5. An apparatus as in claim 4 further including a shroud having a radially extending surface and longitudinally slidable along said conduit for selectable movement between a first position upwardly adjacent one of said nozzle assemblies and a second position upwardly adjacent another of said nozzle assemblies.

6. An apparatus as in claim 1 wherein said container includes a top presenting a strike plate for withstanding the impact forces of a hammer for driving the second end of the conduit into the ground.

7. An apparatus for mixing a concentrated formula fluid with water and dispensing the mixture, the apparatus comprising:

a tubular handle having first and second ends, said first end adapted to be coupled to a supply of pressurized water;

a conduit having a proximal end relative to a user coupled to said first end of said handle and a distal end having a pointed configuration for penetrating a ground surface, said conduit defining a bore between said proximal and distal ends, whereby the pressurized water passes from said handle into said bore;

a dispenser assembly for containing a quantity of a concentrated fluid chemical attached to said handle and having a top presenting a strike plate for withstanding impact forces of a hammer;

means for mixing a concentrated fluid chemical in said chemical dispenser assembly with the water passing through said conduit, said mixing means including a tube connected to said conduit within the dispenser assembly and extending into said dispenser assembly, whereby the flow of pressurized water through said conduit aspirates the concentrated fluid chemical from said dispenser assembly into said conduit, said conduit extending through said dispenser assembly;

a plurality of outlet ports radially positioned about said conduit, whereby the mixture of the concentrated fluid chemical and water is dispensed from said conduit, each said outlet port comprising:

an upstream portion having a downwardly tapered face defining a plurality of radially spaced apart apertures in fluid communication with said bore, said apertures being recessed from a longitudinal plane defined by said conduit;

a downstream portion having an upwardly tapered face defining a plurality of radially spaced apart apertures in fluid communication with said bore, said apertures being recessed from said longitudinal plane, said face of said downstream portion in abutting engagement with said face of said upstream portion; and wherein said distal end includes a cone section having an upper end and a tip, said upper end in abutting engagement with a downstream portion of an adjacent outlet port and having a diameter greater than a diameter of said conduit.

8. An apparatus as in claim 7 further comprising a shroud having a radially extending surface and longitudinally slidable along said conduit for selective movement between a first position upwardly adjacent one of said outlet ports and a second position upwardly adjacent another of said outlet ports.

9. An apparatus for mixing a concentrated formula fluid with water and dispensing the mixture, the apparatus comprising:

a tubular conduit adapted for fluid flow having proximal and distal ends relative to a user, said conduit having a plurality of nozzle assemblies longitudinally spaced apart along said conduit between said proximal and distal ends, each nozzle assembly comprising:

an upstream portion having a downwardly tapered face defining at least one aperture through said conduit, said aperture being recessed from a longitudinal plane defined by said conduit;

a downstream portion having an upwardly tapered face defining at least one aperture through said conduit, said aperture being recessed from said longitudinal plane of said conduit, said face of said downstream portion in abutting engagement with said face of said upstream portion;

a point assembly attached to said distal end adapted to penetrate a ground surface, said point assembly including a cone section having an upper end and a tip, said upper end in abutting engagement with a downstream portion of an adjacent nozzle assembly and having a diameter greater than a diameter of said conduit;

means for connecting said proximal end of said conduit to a pressurized water source;

a reservoir for holding a concentrated formula fluid, the reservoir coupled to said conduit, said conduit extending through said reservoir; and means for mixing the formula fluid with said water flowing through said conduit.

10. An apparatus as in claim 9 wherein said connecting means includes a first tubular handle attached to said reservoir and normal to said conduit, said first handle having a free end adapted for connection with the pressurized water source and an opposed end coupled to said proximal end of said conduit for fluid communication therebetween; and said apparatus further comprising a second handle attached to said reservoir and extending opposite said first handle, whereby said distal end of said conduit penetrates a ground surface when force is exerted on said first and second handles by a user and said distal end of said conduit is in contact with the ground surface.

11. An apparatus as in claim 9 wherein said mixing means includes a tube connected to said conduit within said container at one end and extending into said reservoir, whereby the flow of pressurized water through said conduit aspirates the insecticide from said container into said conduit.

12. An apparatus as in claim 9 wherein said reservoir includes a rigid top plate adapted to withstand impact forces, whereby said tip of said point assembly penetrates a ground surface upon a user exerting impact forces on said top plate when said second end is adjacent the ground surface.

13. An apparatus as in claim 9 further comprising a shroud having a radially extending surface and being longitudinally slidable along said conduit for selective movement between a first position upwardly adjacent one of said nozzle assemblies and a second position upwardly adjacent another of said nozzle assemblies.

* * * * *